US010832220B2

(12) United States Patent
Whitney et al.

(10) Patent No.: US 10,832,220 B2
(45) Date of Patent: Nov. 10, 2020

(54) METHODS, DEVICES AND SYSTEMS FOR MANAGING GROUP MEMBERSHIP AND RECORD VERIFICATION USING BLOCKCHAIN

(71) Applicant: AT&T Intellectual Property I, L.P., Atlanta, GA (US)

(72) Inventors: Joshua Whitney, Richardson, TX (US); Matt Dugan, Plano, TX (US); Johan Muedsam, Plano, TX (US); Aarthi Reddy, Allen, TX (US); Divesh Srivastava, Summit, NJ (US); Yaron Kanza, Fairlawn, NJ (US); Jean Luo, Berkeley, CA (US); Chih Chien Huang, Mountain View, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 220 days.

(21) Appl. No.: 16/049,192

(22) Filed: Jul. 30, 2018

(65) Prior Publication Data

US 2019/0279160 A1 Sep. 12, 2019

Related U.S. Application Data

(60) Provisional application No. 62/639,383, filed on Mar. 6, 2018.

(51) Int. Cl.
*G06Q 10/10* (2012.01)
*G06F 21/62* (2013.01)
*H04L 9/06* (2006.01)

(52) U.S. Cl.
CPC ..... *G06Q 10/1053* (2013.01); *G06F 21/6254* (2013.01); *H04L 9/0643* (2013.01); *G06Q 2220/10* (2013.01); *H04L 2209/38* (2013.01)

(58) Field of Classification Search
CPC .................................................. G06Q 10/1053
See application file for complete search history.

(56) References Cited

U.S. PATENT DOCUMENTS 7,673,047 B2 3/2010 Delany et al.
9,100,453 B2 8/2015 Chen et al.
(Continued)

FOREIGN PATENT DOCUMENTS

CN 107483211 A 12/2017
WO WO-2017153495 A1 * 9/2017 ......... G06Q 10/1053

OTHER PUBLICATIONS

Onik et al., "A Recruitment and Human Resource Management Technique Using Blockchain Technology for Industry 4.0" in Proceeding of Smart Cities Symposium (SCS-2018), Manama, Bahrain, 2018, pp. 11-16. (Year: 2018).*

(Continued)

*Primary Examiner* — Jacob C. Coppola
(74) *Attorney, Agent, or Firm* — Guntin & Gust, PLC; John Rauch

(57) ABSTRACT

Aspects of the subject disclosure may include, for example, embodiments include receiving first user-generated input from a recruiter device. The recruiter device is associated with a manager of a group. Further embodiments include generating a first smart contract between an applicant and the manager according to the first user-generated input. The generating of the first smart contract comprises generating the first smart contract on a blockchain. Additional embodiments can include providing the applicant access to the group according to the first smart contract, receiving second user-generated input from the recruiter device, and generating a second smart contract between a record keeper and the manager according to the second user-generated input. The generating of the second smart contract comprises generating the second smart contract on the blockchain.

(Continued)

Also, embodiments can include providing the record keeper access to the group according to the second smart contract. Other embodiments are disclosed.

20 Claims, 14 Drawing Sheets

(56) References Cited

U.S. PATENT DOCUMENTS

| | | | |
|---|---|---|---|
| 9,356,778 B2 | 5/2016 | Vanstone et al. | |
| 9,824,031 B1 | 11/2017 | Ganti et al. | |
| 9,871,775 B2 | 1/2018 | Biggs et al. | |
| 9,992,022 B1 | 6/2018 | Chapman et al. | |
| 2008/0140680 A1* | 6/2008 | Hyder | G06Q 10/06 |
| 2008/0215737 A1 | 9/2008 | Klausberger | |
| 2014/0129573 A1* | 5/2014 | deWaal | G06Q 10/00 |
| | | | 707/751 |
| 2014/0149540 A1 | 5/2014 | Mankala | |
| 2015/0120587 A1* | 4/2015 | Bramel | G06Q 10/1053 |
| | | | 705/319 |
| 2015/0135277 A1 | 5/2015 | Vij et al. | |
| 2015/0317608 A1* | 11/2015 | Goel | G06Q 10/1053 |
| | | | 705/319 |
| 2017/0366357 A1 | 12/2017 | Pattanaik et al. | |
| 2018/0082256 A1* | 3/2018 | Tummuru | H04L 9/3236 |
| 2018/0083785 A1 | 3/2018 | Shields et al. | |
| 2018/0089627 A1* | 3/2018 | Liss | G06Q 10/1053 |
| 2018/0157825 A1 | 6/2018 | Eksten et al. | |
| 2019/0114593 A1* | 4/2019 | Champaneria | G06F 16/3325 |
| 2019/0197532 A1* | 6/2019 | Jayachandran | H04L 9/0618 |
| 2019/0236065 A1* | 8/2019 | Torrenegra | G06F 16/248 |

OTHER PUBLICATIONS

Michailidis, Maria, "The Challenges of AI and Blockchain on HR Recruiting Practices," The Cyprus Review, vol. 30:2, all pages. (Year: 2018).*

"The future of HR: how a blockchain can change the recruitment process", Crypto News, www.managermint.com, https://medium.com/manager-mint/the-future-of-hr-how-a-blockchain-can-change-the-recruitment-process-3e1d833afc1b, Dec. 9, 2017, 5.

Liu, et al., "360 Innovations for Panoramic Video Streaming", Proceedings of the 16th ACM Workshop on Hot Topics in Networks, ACM, 2017, 7 pages.

Qian, Feng et al., "Optimizing 360 video delivery over cellular networks." Proceedings of the 5th Workshop on All Things Cellular: Operations, Applications and Challenges, ACM, 2016, pp. 1-6.

* cited by examiner

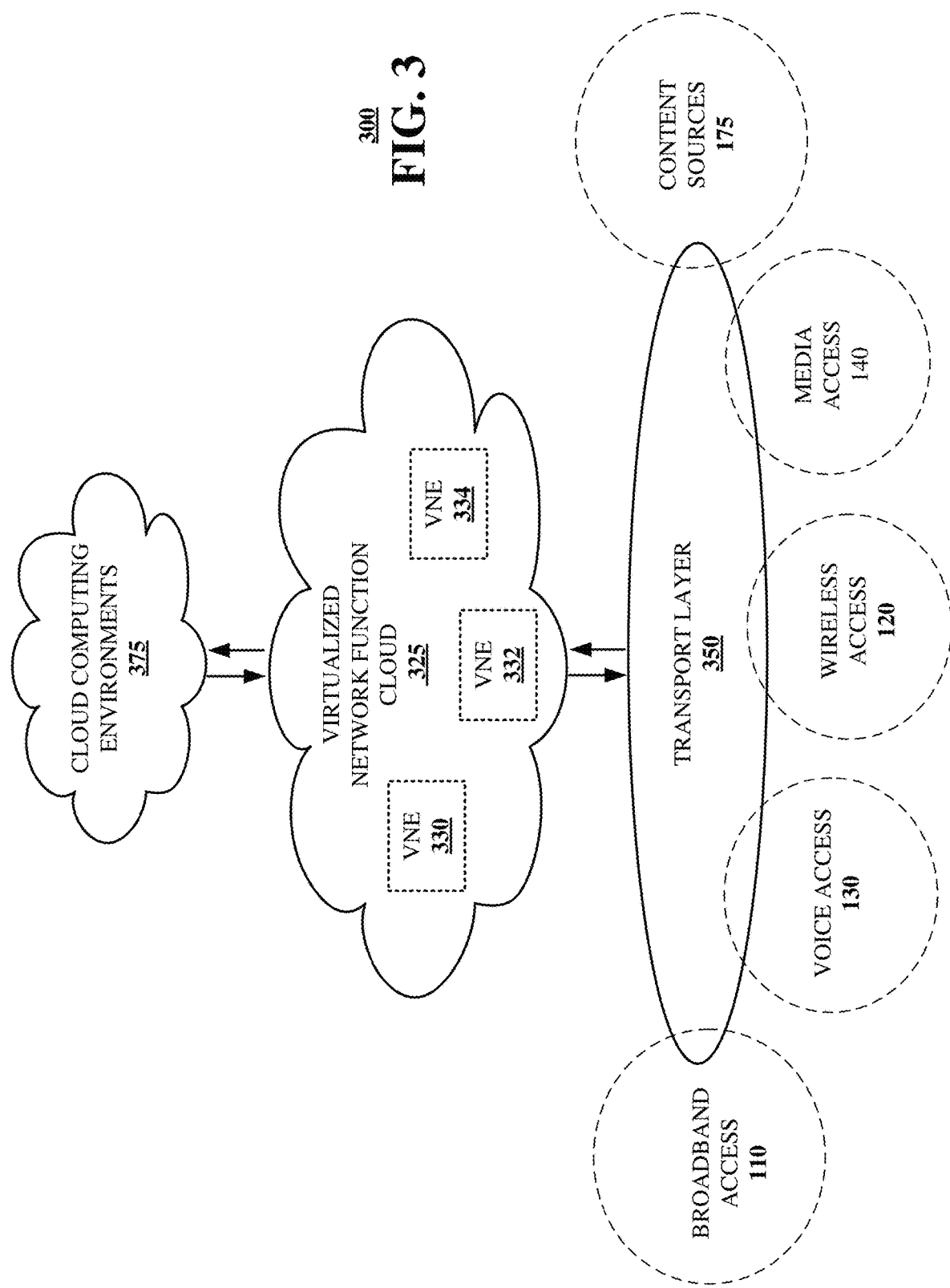

METHODS, DEVICES AND SYSTEMS FOR MANAGING GROUP MEMBERSHIP AND RECORD VERIFICATION USING BLOCKCHAIN

CROSS-REFERENCE TO RELATED APPLICATIONS

This application claims the benefit and claims priority to U.S. Patent Application No. 62/639,383, filed Mar. 6, 2018. All sections of the aforementioned application is incorporated herein by reference in its entirety.

FIELD OF THE DISCLOSURE

The subject disclosure relates to methods, devices and systems for managing group membership and records verification using blockchain.

BACKGROUND

Blockchain has emerged in recent years to provide various applications. For example, blockchain has been used to provide a secure, decentralized manner in which to transfer money among peers. Further, blockchain has provided a way to provide trust among entities that do not know each other. In addition, blockchain provides a fault tolerant system to provide applications.

BRIEF DESCRIPTION OF THE DRAWINGS

Reference will now be made to the accompanying drawings, which are not necessarily drawn to scale, and wherein:

FIGS. 2G-2I are block diagrams illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
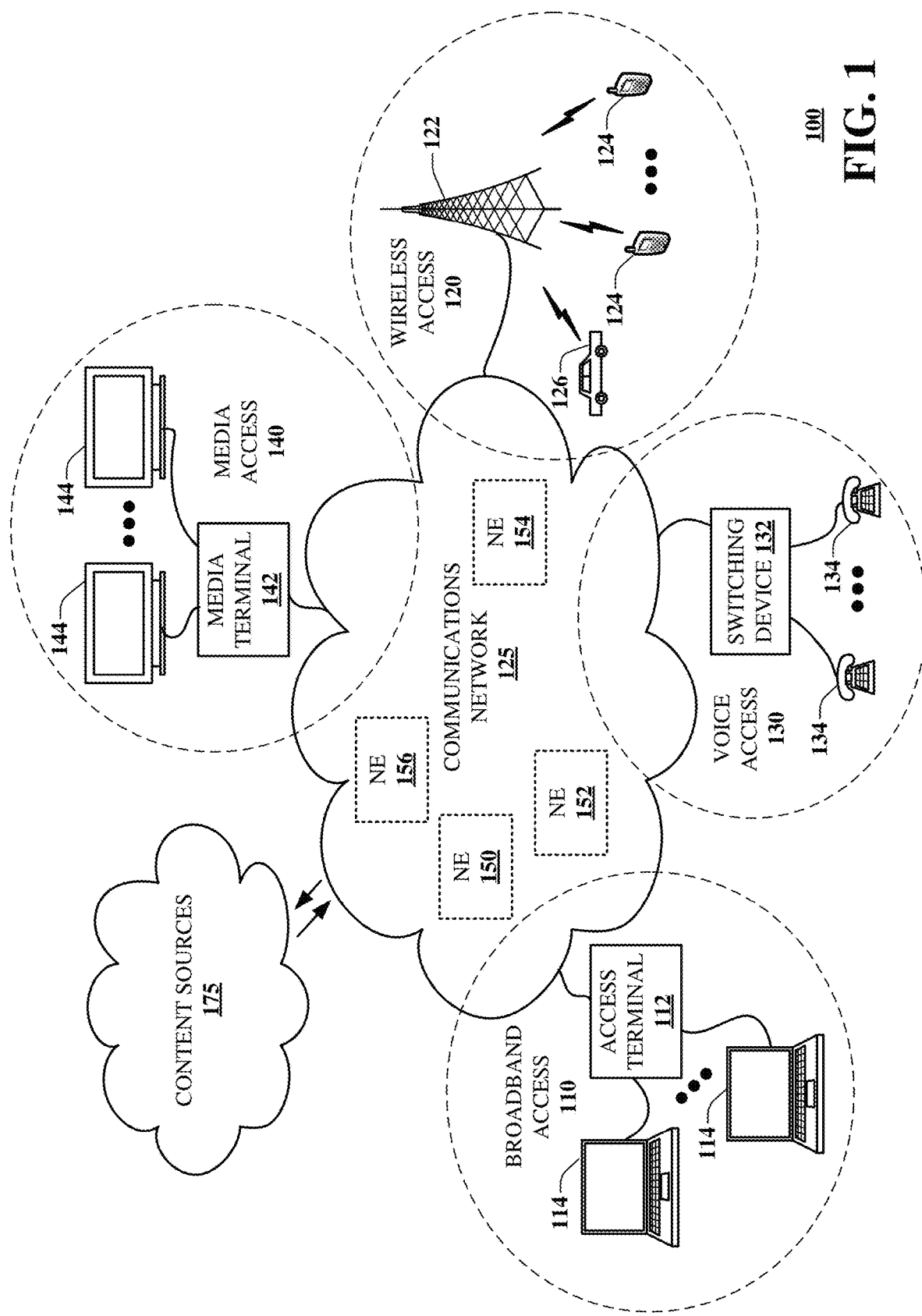
FIG. 1 is a block diagram illustrating an example, non-limiting embodiment of a communications network in accordance with various aspects described herein.

The subject disclosure describes, among other things, illustrative embodiments for receiving first user-generated input from a recruiter device. The recruiter device is associated with a manager of a group. Further embodiments can include generating a first smart contract between an applicant and the manager according to the first user-generated input. The generating of the first smart contract comprises generating the first smart contract on a blockchain. Additional embodiments can include providing the applicant access to the group according to the first smart contract. Also, embodiments can include receiving second user-generated input from a manger device, and generating a second smart contract between a record keeper and the manager according to the second user-generated input. The generating of the second smart contract comprises generating the second smart contract on the blockchain. Further, embodiments can include providing the record keeper access to the group according to the second smart contract. Other embodiments are described in the subject disclosure.

One or more aspects of the subject disclosure include a device, comprising a processing system including a processor, and a memory that stores executable instructions that, when executed by the processing system, facilitate performance of operations. Operations can include receiving first user-generated input from a recruiter device. The recruiter device is associated with a manager of a group. Further operations can include generating a first smart contract between an applicant and the manager according to the first user-generated input. The generating of the first smart contract comprises generating the first smart contract on a blockchain. Additional operations can include providing the applicant access to the group according to the first smart contract. Also, operations can include receiving second user-generated input from the recruiter device. Further operations can include generating a second smart contract between a record keeper and the manager according to the second user-generated input. The generating of the second smart contract comprises generating the second smart contract on the blockchain. Additional operations can include providing the record keeper access to the group according to the second smart contract.

One or more aspects of the subject disclosure include a machine-readable medium, comprising executable instructions that, when executed by a processing system including a processor, facilitate performance of operations. Operations can include receiving first user-generated input from a recruiter device. The recruiter device is associated with a manager of a group. Further operations can include generating a first smart contract between an applicant and the manager according to the first user-generated input. The generating of the first smart contract comprises generating the first smart contract on a blockchain. Additional operations can include providing the applicant access to the group according to the first smart contract. Also, operations can include receiving second user-generated input from the recruiter device. Further operations can include generating a second smart contract between a record keeper and the manager according to the second user-generated input. The generating of the second smart contract comprises generating the second smart contract on the blockchain. Additional operations can include providing the record keeper access to the group according to the second smart contract. Also, operations can include receiving a portion of applicant records from a record keeper device. Further operations can include publishing a portion of the applicant records to the blockchain. Additional operations can include receiving third user-generated input from an applicant device. Also, operations can include signing the portion of the applicant records on the blockchain according to the third user-generated input.

One or more aspects of the subject disclosure include a method. The method can include receiving, by a processing system including a processor, first user-generated input from a recruiter device, wherein the recruiter device is associated with a manager of a group. Further, the method can include generating, by the processing system, a first smart contract between an applicant and the manager according to the first user-generated input. The generating of the first smart contract comprises generating, by the processing system, the first smart contract on a blockchain. In addition, the method can include providing, by the processing system, the applicant access to the group according to the first smart contract. Also, the method can include receiving, by the processing system, second user-generated input from the recruiter device. Further, the method can include generating, by the processing system, a second smart contract between a record keeper and the manager according to the second user-generated input. The generating of the second smart contract comprises generating, by the processing system, the second smart contract on the blockchain. In addition, the method can include providing, by the processing system, the record keeper access to the group according to the second smart contract. Also, the method can include receiving, by the processing system, a portion of applicant records from a record keeper device. Further, the method can include publishing, by the processing system, a portion of the applicant records to the blockchain. The publishing the portion of the applicant records comprises hashing, by the processing system, the portion of the applicant records resulting in a hashed portion of the applicant records. In addition, the method can include receiving, by the processing system, third user-generated input from an applicant device. Also, the method can include signing, by the processing system, the portion of the applicant records on the blockchain according to the third user-generated input. Further, the method can include receiving, by the processing system, fourth user-generated input from the recruiter device. The fourth user-generated input comprises a request for the portion of the applicant records. In addition, the method can include sending, by the processing system, a notification to the applicant device. The notification indicates the applicant of the request. In addition, the method can include obtaining, by the processing system, the portion of the applicant records from the hashed portion of the applicant records from a database in response to receiving, by the processing system, a fifth user-generated input from the applicant device, wherein the fifth user-generated input comprises an approval to provide the portion of the applicant records. Also the method can include providing, by the processing system, the portion of the applicant records to the recruiter device.

Referring now to FIG. 1, a block diagram is shown illustrating an example, non-limiting embodiment of a communications network 100 in accordance with various aspects described herein. A blockchain server that manages group membership and a records verification system, as described herein, can be a network element within communication network 100.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2D are block diagrams illustrating example, non-limiting embodiments of systems functioning within the communication network of FIG. 1 in accordance with various aspects described herein. Referring to FIG. 1A, in one or more embodiments, the system 200 includes a blockchain server 204 communicatively coupled to a database 206. Further, multiple user devices 208-213 are communicatively coupled to the blockchain server 204 over a communication network 202. Each user device 208-213 is associated with a user 214-219. The communication network 202 can include the Internet or portions thereof, cellular networks, satellite networks, data networks, WiFi networks, wireless networks, etc. The user device 208-213 can include laptop computers, mobile devices, mobile phones, smartphones, tablet computers, desktop computers, wearable devices, smartwatches, or any other computing device. The group can be one that has access to repository of information (e.g. information stored in database 206) or can be a collection of individuals whose names are organized in a hierarchy such as a phone directory. Further, the information in the repository can be encrypted using cryptographic techniques to provide security from access of the information. Further, the user associated with the information can be anonymized using crytogrpahic techniques to provide additional security to the information.

In one or more embodiments, a user 214 can be a manager of a group that provides access to group to other members or managers. A user 214 can provide user-generated input, via the user device 208, to the blockchain server 204. The user-generated input can indicate to the blockchain server 204 to allow a user 216 to be a member of the group. Further, the blockchain server 204 can generate a smart contract that allows for user 216 access, via user device 210, to the group. In addition, the blockchain server 204 can provide access to user 216, via user device 210, to the group. In some embodiments, access to the group can include extracting information from the database 206 as well as providing and storing information in database 206. Extracting information form the database can include decrypting the information so that it can be viewed by a user. In other embodiments, the user 214 can provide additional user-generated input to the blockchain server 204 that indicates to allow access to the group for one or more users 218-219, via user devices 212-213. Further, the blockchain server 204 can generate a smart contract, individually, that allows for each user 218-219 access, via user device 212-214, to the group. In addition, the blockchain server 204 can provide access to users 218-219, via user devices 212-213, to the group. Access to the information from user devices 208-213 can be from a mobile application or web application through a blockchain application programming interface (API).

In one or more embodiments, the user 214 can provide user-generated input that indicates the tier or level of access to the group. For example, access to the group can be two tiers. A first tier of access can be for members that has access to certain information stored in database 206 and cannot indicate to the blockchain server 204 other users to be members or managers of the group. A second tier of access can be for managers that has access to all information stored in database 206 and can indicate to the blockchain server 204 other users to be members or managers of the group.

In one or more embodiments, the blockchain used by blockchain server 204 can be Bitcoin, Ethereum, Hyperledger, or some other blockchain. In some embodiments, the blockchain utilized by the blockchain server 204 can be an internal blockchain interacting with users that associated with one entity (e.g. users are all employees of a company). In other embodiments, the blockchain utilized by the blockchain server 204 can be an external blockchain interacting with users that associated with more than one entity. Further, utilizing a blockchain to manage access to a group allows for fault tolerance, i.e. no single point of failure. That is, blockchain server 204 can be a virtual server whose functions are spread across different physical servers and can provide redundant functionality such if one of the servers has outage, other servers can provide identical or similar functions to continue the functions of the blockchain (e.g. manage access to the group). In addition, utilization a blockchain to manage access to a group allows for distributing trust in managing the group. That is, a third party blockchain can authenticate users to be members of the group who are strangers to one another.

Figure 2A:
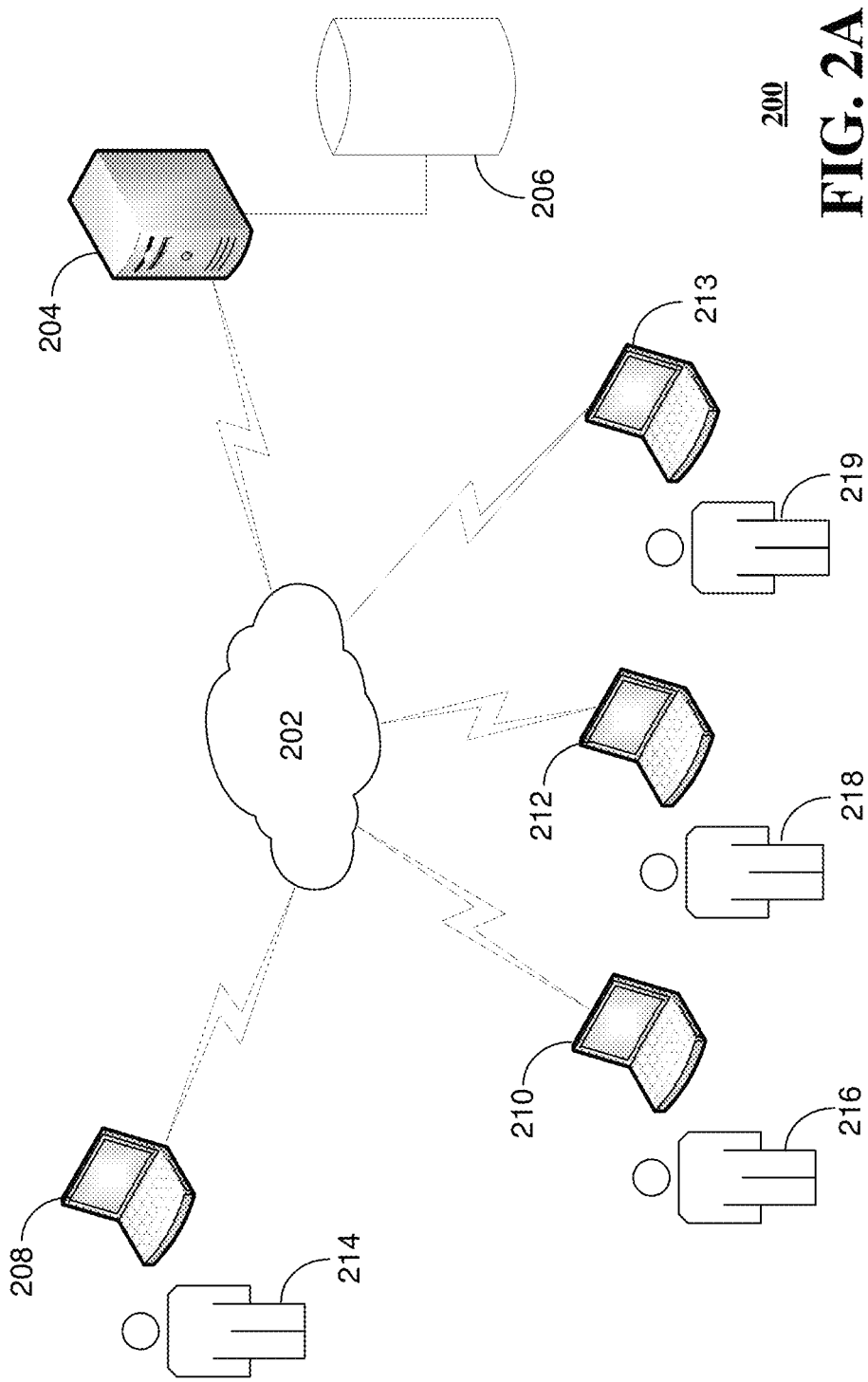
FIGS. 2A-2D are block diagrams illustrating example, non-limiting embodiments of systems functioning within the communication network of FIG. 1 in accordance with various aspects described herein.
Figure 2B:
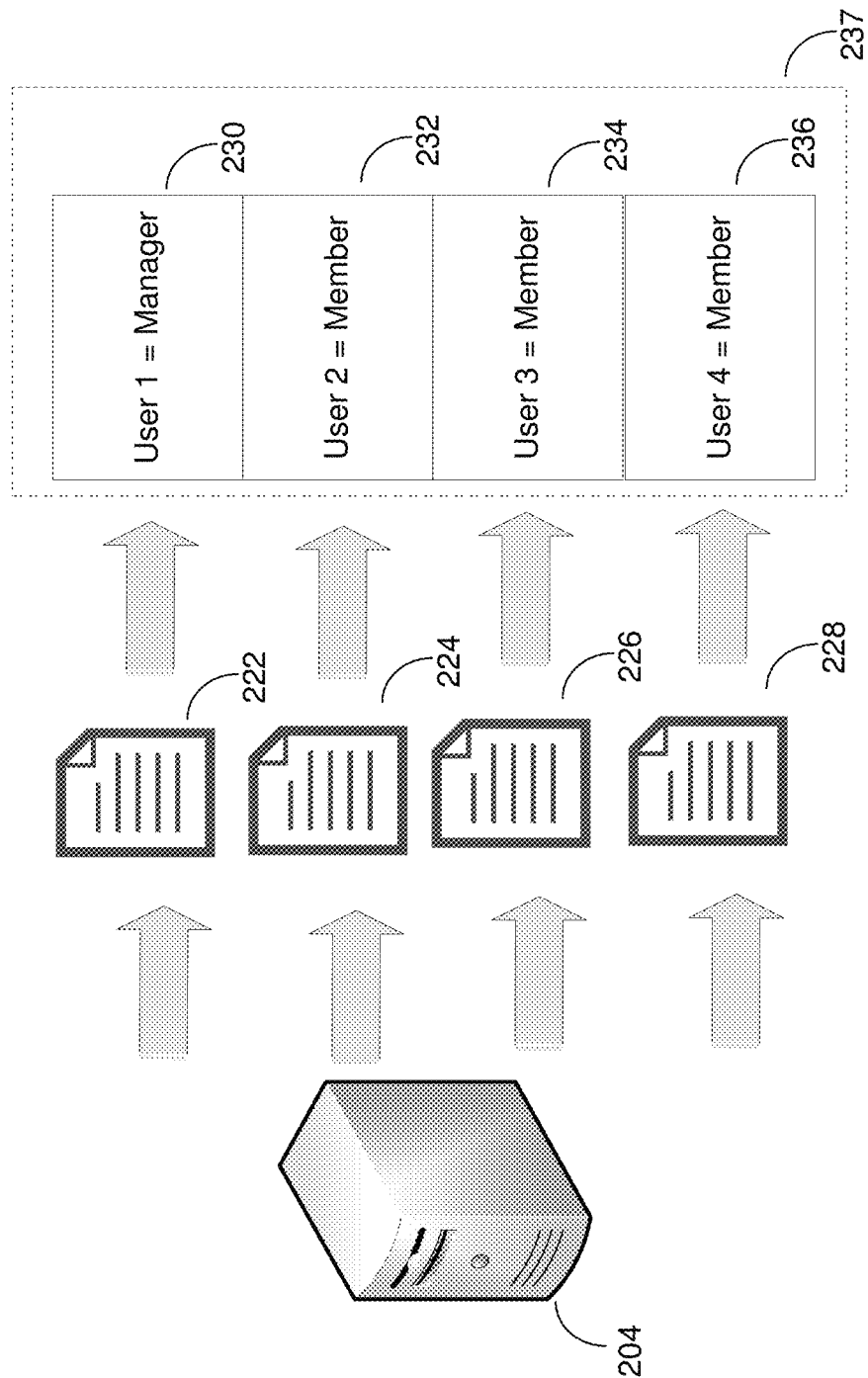

Referring to FIG. 2B, the system 220 includes the blockchain server 204 that generates smart contracts 222-228 to allow access of multiple users 230-236 to a group. A first contract 222 can be generated by blockchain server 204 for a first transaction at first block 230 in a blockchain 237. The first smart contract/first transaction can allow user 1 access to the group as a manager (second tier access). Further, a second contract 224 can be generated by blockchain server 204 for a second transaction at second block 232 in the blockchain 237. The second smart contract/second transaction can allow user 2 access to the group as a member (first tier access). In addition, a third contract 226 can be generated by blockchain server 204 for a third transaction at third block 234 in the blockchain 237. The third smart contract/ third transaction can allow user 3 access to the group as a member (first tier access). Also, a fourth contract 228 can be generated by blockchain server 204 for a fourth transaction at fourth block 236 in the blockchain 237. The fourth smart contract/fourth transaction can allow user 4 access to the group as a member (first tier access).

Figure 2C:
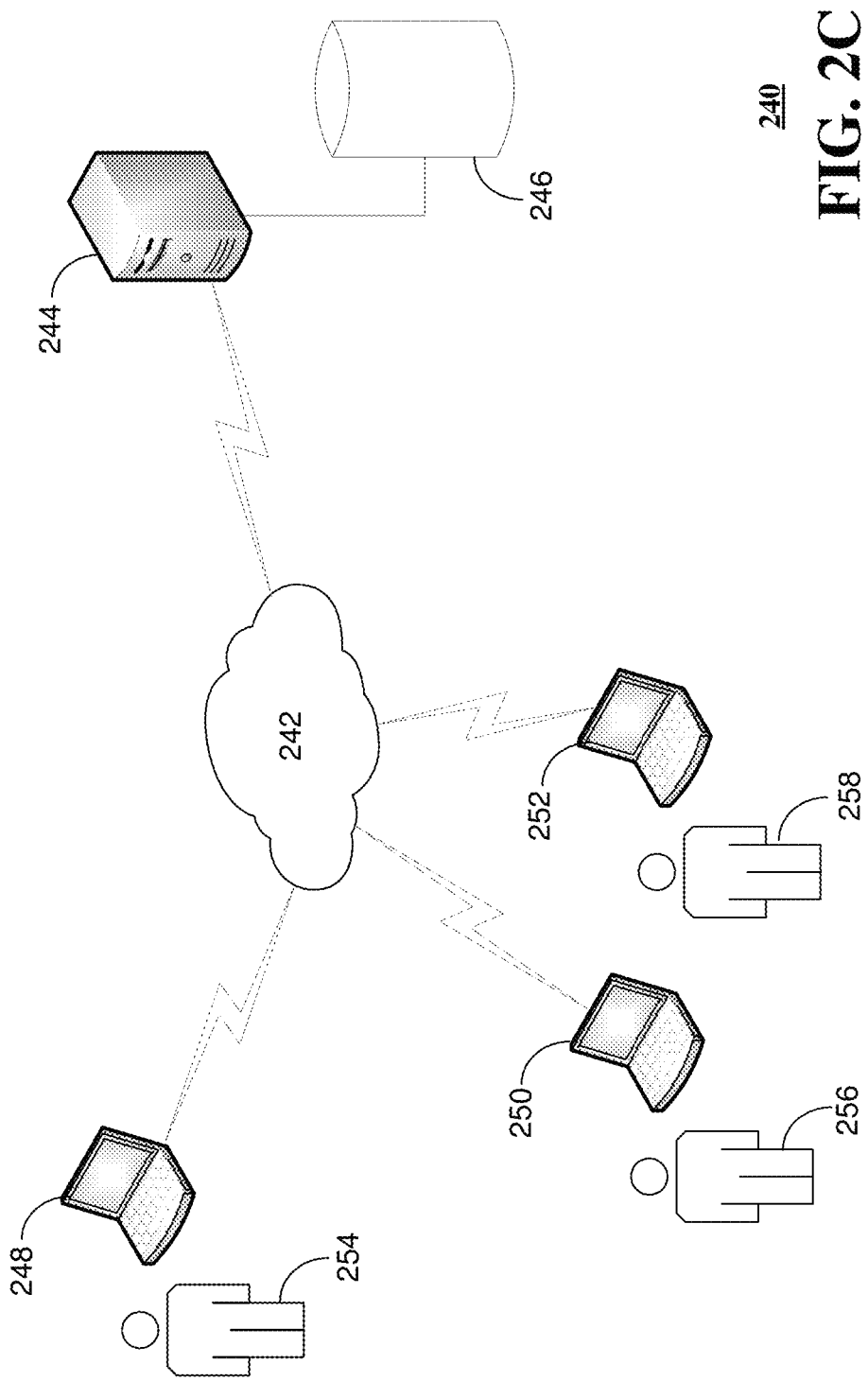

Referring to FIG. 2C, in one or more embodiments, the system 240 includes a blockchain server 244 communicatively coupled to a database 246. Further, multiple user devices 248-252 are communicatively coupled to the blockchain server 244 over a communication network 242. Each user device 248-252 is associated with a user 254-258. The communication network 242 can include the Internet or portions thereof, cellular networks, satellite networks, data networks, WiFi networks, wireless networks, etc. The user device 248-252 can include laptop computers, mobile devices, mobile phones, smartphones, tablet computers, desktop computers, wearable devices, smartwatches, or any other computing device. Blockchain server 244 can be a virtual server or a group of servers spread out among different locations. Further, the blockchain server 244 can implement one of a Bitcoin blockchain, an Ethereum blockchain, and a Hyperledger blockchain.

In one or more embodiments, user 254 can be a recruiter working in a company, user 256 can be an applicant for a job at the company, and user 258 can be a record keeper at a university that has access to the applicant's student records. Further, user device 248 can be a recruiter device associated with the recruiter 254, user device 250 can be an applicant device associated with the application 256, and user device 252 can be a record keeper device associated with the record keeper 258. In some embodiments, the blockchain associated with the blockchain server 244 can be used a student records verification system for applicant applying for jobs with the recruiter at the company. Although some embodiments describe student records verification system described herein, other record verification systems can be implemented by the methods, systems, and devices described herein.

In one or more embodiments, the recruiter 254 can be a manager of a group associated with the student verification system and provides access to extract and publish or store student records to the group, which can publish or store records in and extract records from a database 246. Access to the group can be provided to the applicant 256, via applicant device 250, and record keeper 258, via record keeper device 252, according the embodiments described herein.

In one or more embodiments, the blockchain server 244 receives portions of the applicant's records from the record keeper device. Applicant records can include attributes that comprise a full name of the applicant, an applicant identifier, university name, type of degree, department, and graduation year. Portions of the applicant records comprises an attribute. The blockchain server 244 publishes the portions of the applicant records to the blockchain and stores the portions of the records into the database 246. Publishing portions of the records can include performing transactions within the blockchain as described herein. In some embodiments, publishing one or more portions of the applicant records comprises hashing the one or more portions of the applicant records resulting in one or more hashed portions of the applicant records. Further, the blockchain server 244 can include storing the hashed portion of the applicant records in a database. Hashing the portion of the applicant records comprises encrypting the one or more portions of the applicant records using cryptographic techniques.

In one or more embodiments, the blockchain server 244 can query the applicant 256, via the applicant device 250, to sign or approve the portions of the student records. In addition, the applicant 256, via the applicant device 250, provides user-generated input to the blockchain server 244, via the applicant device 250 indicating signing or approval of the student records published on the blockchain and stored in the database 246. Signing of the records can include performing a transaction on the blockchain by the blockchain server 244.

In one or more embodiments, the recruiter 254 recruiter can provide user-generated input, via the recruiter device 248, the blockchain server 244 that includes a request for a portion of the application records. In response, the blockchain server 244 can send the applicant 256, via the applicant device 250, a notification that indicates to the applicant of the request. In some embodiments, the blockchain server 244 can include obtaining the portion of the applicant records from the hashed portion of the applicant records from the database 246 in response to receiving a user-generated input from the applicant, via the applicant device 250. The user-generated input can include an approval to provide the portion of the applicant records. In addition, the blockchain server 244 can include providing the portion of the applicant records to the recruiter device. Providing the portion of the applicant records can include decrypting the portion of the applicant records so that they can be viewed by the recruiter.

In one or more embodiments, users 254-258 can interact with the blockchain server 244 through either a mobile application or web application via user devices 248-252 through a blockchain API.

In one or more embodiments, the applicant records can comprise an image of the applicant (e.g. facial image). Such an image can be published to the blockchain as described herein and stored (encrypted) in database 246. In further embodiments, the applicant 256 can capture a current image of the applicant 256 using an image capture device associated with the applicant device 250 and provide the current image to the blockchain server 244. In additional embodiments, the blockchain server 244, in response to request by the recruiter 254, via the recruiter device 248, can compare the current image to the image encrypted and stored by the blockchain server 244 in database 246 using image recognition techniques. As a result of the comparison, the blockchain server 244 can notify the recruiter 254, via recruiter device 248 whether or not the current image of the applicant matches to stored image of the applicant.

Figure 2D:
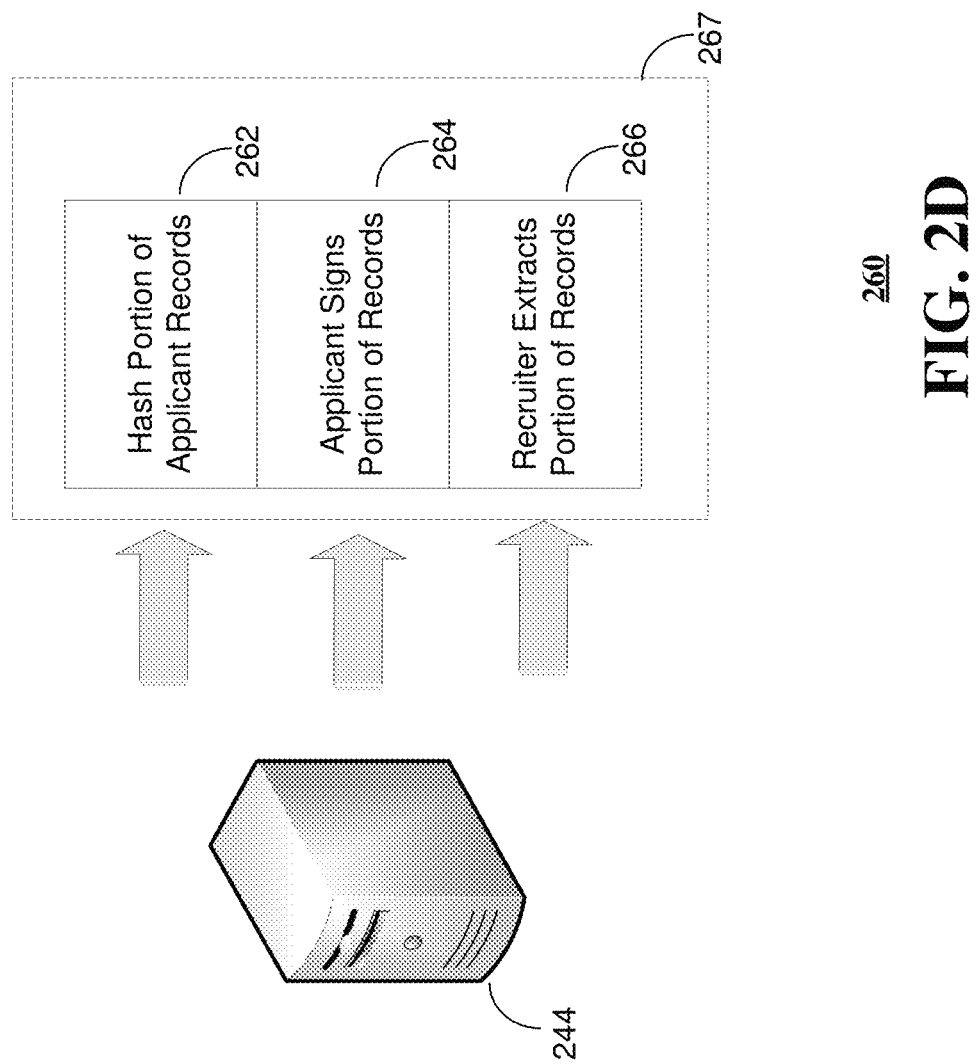

Referring to FIG. 2D, in one or more embodiments, the system 260 can include the blockchain server 244 performing transactions on a blockchain 267 of the student records verification system described in FIG. 2C. In some embodiments, the blockchain server 244 hashes a portion of the applicant records as a transaction on block 262. In other embodiments, the blockchain server 244 can hash a different portion of the applicant records over more than one block in the blockchain 267. In further embodiments, the blockchain server 244 can perform a transaction of the applicant signing a portion of the applicant records at block 264. In further embodiments, the blockchain server 244 can perform a transaction of the recruiter, via the recruiter device, on block 266 to extract the portion of the records from a database.

Figure 2E:
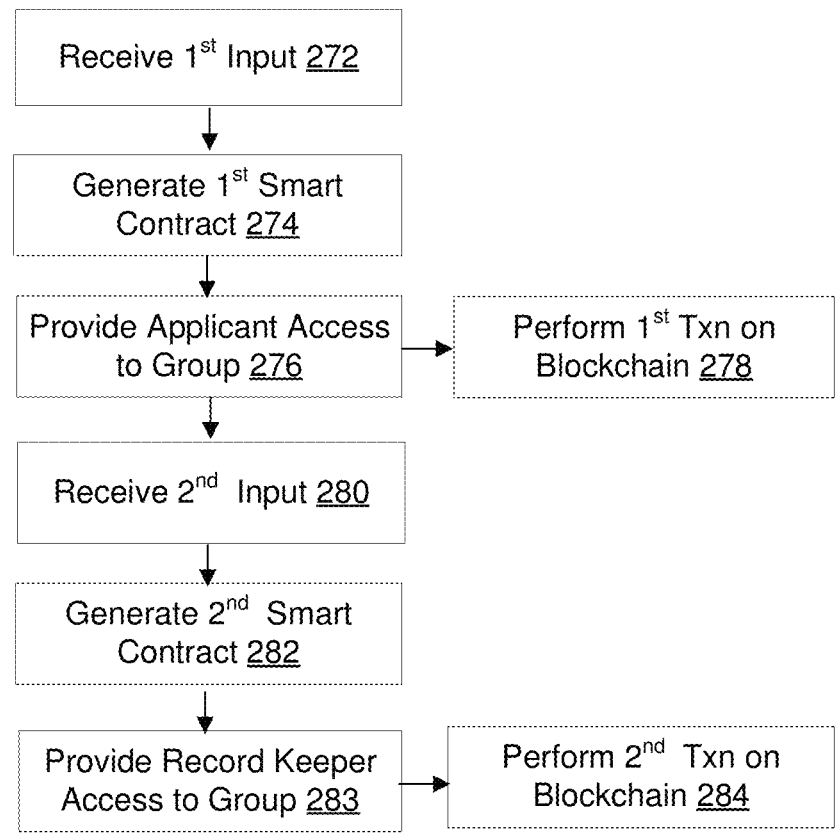
FIGS. 2E-F depicts illustrative embodiments of methods in accordance with various aspects described herein.
Figure 2F:
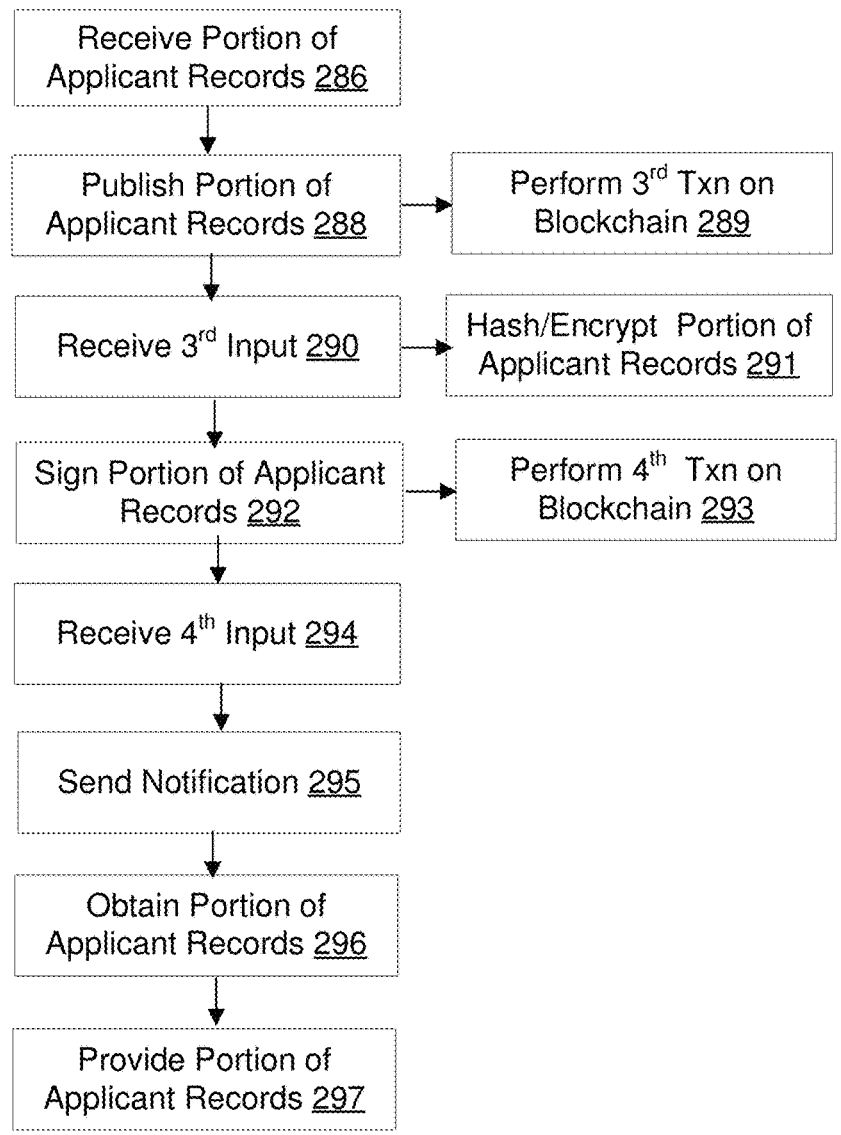

FIGS. 2E-F depicts illustrative embodiments of methods 270, 285 in accordance with various aspects described herein. Methods 270, 285 can be implemented individually, collectively, or on conjunction with each other. Further, methods 270, 285 can be implemented by a blockchain server or multiple blockchain servers.

In one or more embodiments, the method 270 can include the blockchain server, at 272, receiving first user-generated input from a recruiter device. The recruiter device is associated with a manager of a group. Further, the method 270 can include the blockchain server, at 274, generating a first smart contract between an applicant and the manager according to the first user-generated input. Generating of the first smart contract comprises generating the first smart contract on a blockchain. In addition, the method 270 can include the blockchain server, at 276, providing the applicant access to the group according to the first smart contract. Also, the method 270 can include the blockchain server, at 278, performing a first transaction on the blockchain. In some embodiments, providing the applicant access to the group comprises performing a first transaction on the blockchain.

In one or more embodiments, the method 270 can include the blockchain server, at 280, receiving second user-generated input from recruiter device. Further, the method 270 can include the blockchain server, at 282, generating a second smart contract between a record keeper and the manager according to the second user-generated input. The generating of the second smart contract comprises generating the second smart contract on the blockchain. In addition, the method 270 can include the blockchain server, at 283, providing the record keeper access to the group according to the second smart contract. Also, the method 270 can include the blockchain server, at 284, performing a second transaction on the blockchain. In some embodiments, providing the record keeper access to the group comprises performing a second transaction on the blockchain.

Referring to FIG. 2F, the method 285 can include the blockchain server, at 286, receiving a portion of applicant records from a record keeper device. Further, the method 285 can include the blockchain server, at 288, publishing a portion of the applicant records to the blockchain. In addition, the method 285 can include the blockchain server, at 289, performing a third transaction on the blockchain. In some embodiments, the publishing of the portion of the applicant records to the blockchain comprises performing a third transaction on the blockchain. Also, the method 285 can include the blockchain server, at 290, receiving third user-generated input from an applicant device.

In one or more embodiments, the method 285 can include the blockchain server, at 291, hashing the portion of the applicant records resulting in a hashed portion of the applicant records or encrypting the portion of the applicant records. In some embodiments, hashing the portion of the applicant records comprises encrypting the portion of the applicant records. In other embodiments, the method 285 can include the blockchain server storing the hashed portion of the applicant records in a database.

In one or more embodiments, the method 285 can include the blockchain server, at 292, signing the portion of the applicant records on the blockchain according to the third user-generated input. Further, the method 285 can include the blockchain server, at 293, performing a fourth transaction on the blockchain. In some embodiments, signing of the portion of the applicant records on the blockchain comprises performing a fourth transaction on the blockchain.

In one or more embodiments, the method 285 can include the blockchain server, at 294, receiving fourth user-generated input from the recruiter device. The fourth user-generated input comprises a request for the portion of the applicant records. Further, the method 285 can include the blockchain server, at 295, sending a notification to the applicant device. The notification indicates the applicant of the request. In addition, the method 285 can include the blockchain server, at 296, obtaining the portion of the applicant records from the hashed portion of the applicant records from the database in response to receiving a fifth user-generated input from the applicant device. The fifth user-generated input comprises an approval to provide the portion of the applicant records. Also, the method 285 can include the blockchain server, at 297, providing the portion of the applicant records to the recruiter device. Applicant records can comprise attributes. The attributes can comprise a full name of the applicant, an applicant identifier, university name, type of degree, department, and graduation year. The portion of the applicant records comprises an attribute. The blockchain is one of a Bitcoin blockchain, a Hyperledger blockchain, and an Ethereum block chain. Further, the blockchain can be an internal blockchain within a company or an external blockchain.

While for purposes of simplicity of explanation, the respective processes are shown and described as a series of blocks in FIGS. 2E and 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, portions of embodiments can be combined with other portions of embodiments.

In one or more embodiments, a blockchain server manages group membership using smart contracts to keep track of group membership as well as permission, and to keep auditable log changes to those permission on the blockchain. The blockchain implements group membership and allows adding new members to groups with either normal or managerial permissions. Managers can themselves invite new members to the group. A manager or some other user can create new groups to be administered by the blockchain.

In one or more embodiments, a blockchain can implement group membership as described herein using phone directory data. In some embodiments, the blockchain can implement a search to find a minimum distance between any two selected entries in the directory or group. In other embodiments, the blockchain can implement a search of group members with the identical job title. In further embodiments, metadata can be stored in an off chain database and verify the authenticity of the data by comparing the hashed data with is twin stored on-chain.

In one or more embodiments, a records verification system can be implemented by a blockchain (server). Such embodiments empower users to create, manage, publish, challenge, and verify identity attributes directly and inexpensively, by taking advantage of the decentralized and immutable characteristics of blockchain. Some embodiments support three general types of users: (a) Identity Owners—who create and manage their identity attributes, publish those attributes to the blockchain, and authorize identity challenges initiated by Verifiers. Examples of Identity Owners include students, employees, customers, and digital devices (e.g., IoT); (b) Institutions who are the source of truth and are responsible for publishing that truth to the blockchain, for example, school registrars, government agencies and employers, and service providers; (c) verifiers—who challenge and verify that the veracity of an Identity Owner's identity claim. Verifiers include recruiters, school admission officers, and general truth seekers.

In one or more embodiments, the embodiments can focus on academic credentials for identity management and verification. Further embodiments address hiring and that the recruiter seeks to validate a candidate's claim that he or she graduated from a given school in a given school year with a given degree. In the user scenario, Identity Owner is a student or candidate who uses a mobile app to publish his or her academic credentials to the blockchain, Institution is a school registrar who uses a webapp to publish students' academic credentials to the blockchain, and Verifier is a recruiter who uses a webapp to verify the student's academic credentials. The student interacts directly with the recruiter by accepting or declining challenges of his or her academic credentials.

Figure 2G:
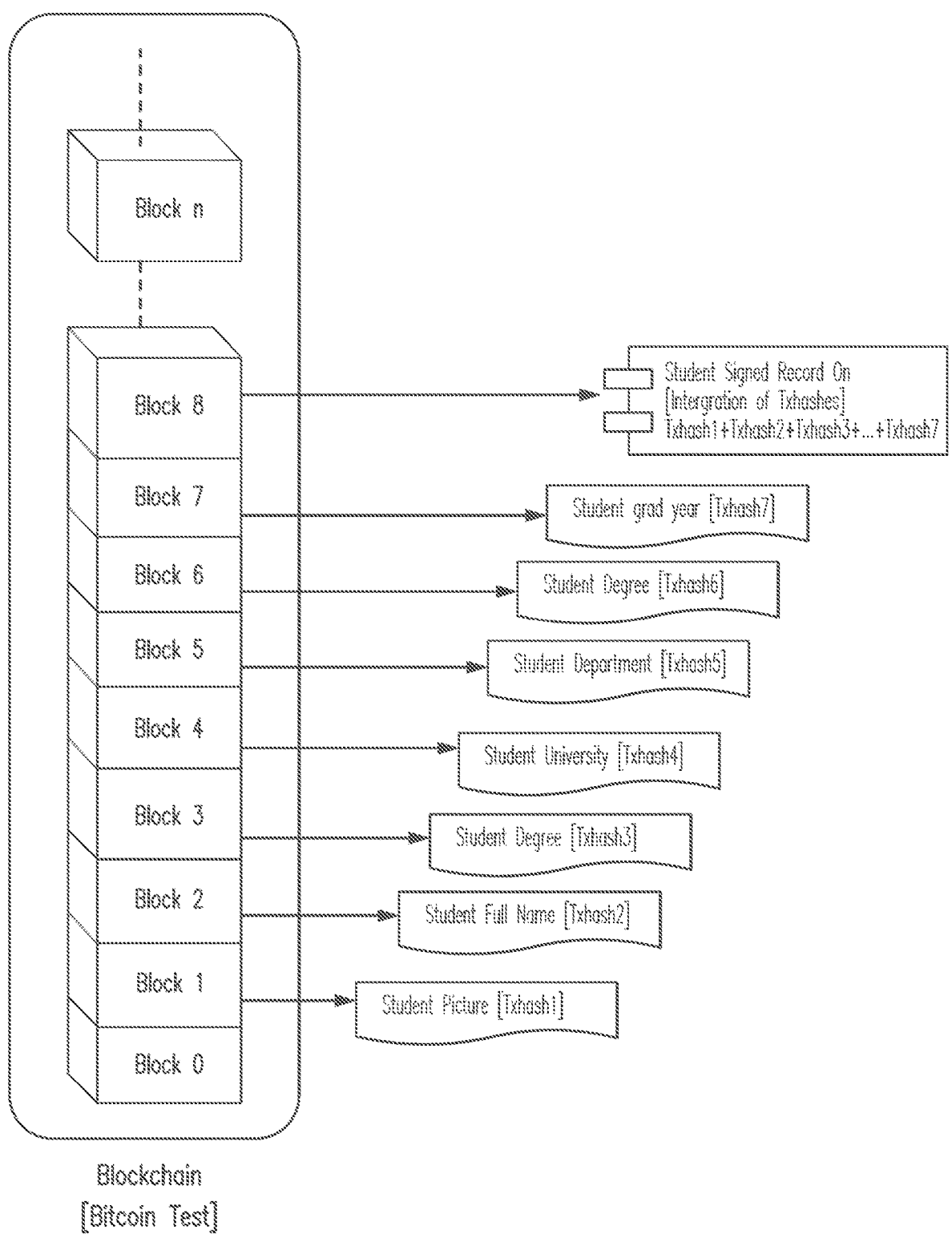

The student's academic credentials can include six attributes: full name; student ID, university, degree, department, and graduation year. To protect data privacy, each attribute is anonymized using a cryptographic hash function before being stored in the blockchain. The transaction hash of those attributes are then concatenated, signed by the user (student or registrar), and persisted in the blockchain (See FIG. 2G). The hash of that transaction record serves as the link between the signer and the anonymized data.

Figure 2H:
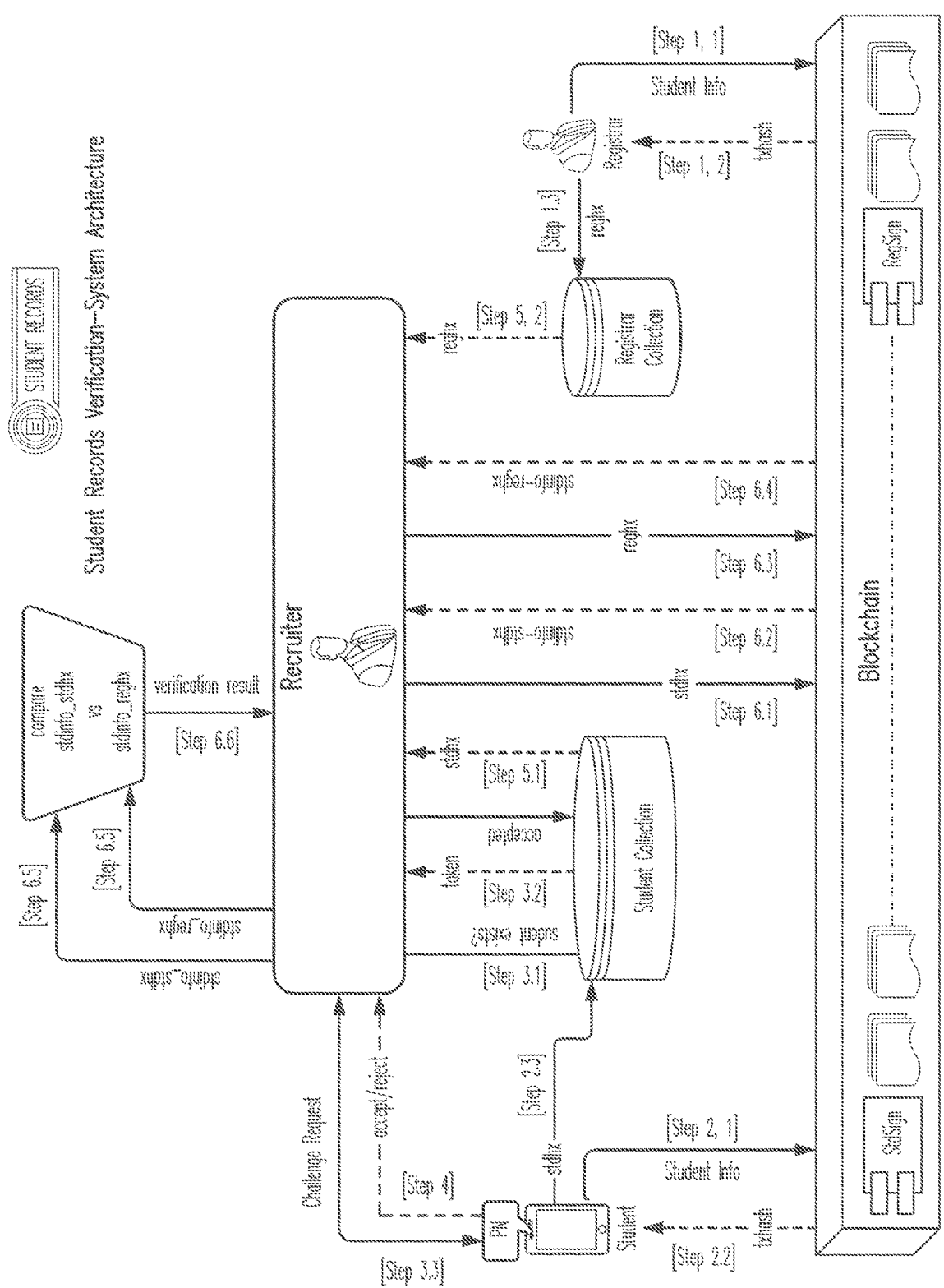
Figure 21:
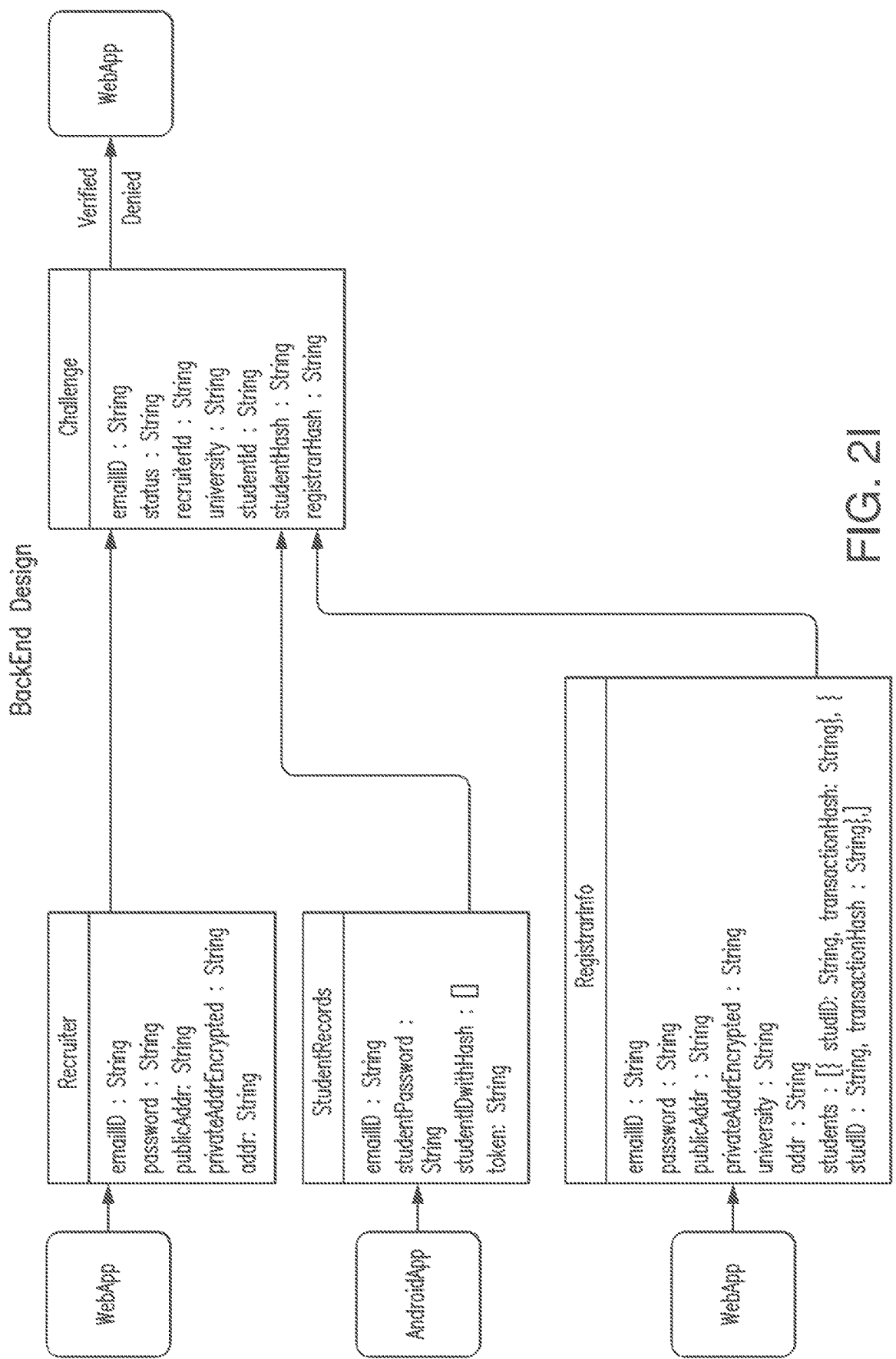

The technical stack of the embodiments can include Android for the mobile app; React for the web app; BlockCypher, Node.js and MongoDB for the backend; and Singularity for containerization. In particular, BlockCypher can be chosen as the blockchain API because it abstracts away technical complexities of blockchain and offers the flexibility to create and operate on any numbers of blockchain, e.g. Bitcoin, Ethereum and private blockchains. FIGS. 2H and 2I illustrates an example, embodiment system as described herein.

In some embodiments, a Registrar working mechanism can include: (1) Registrar publishes each of the student records to the blockchain; (2) Gets the blockchain transaction hash of each student record item; (3) The hashes are concatenated and then stored in MongoDB in Registrar Collections. In other embodiments, a Student working mechanism can include: (1) Student uploads his or her identity information; (2) Gets the blockchain transaction hash of each student record item; (3) The hashes are concatenated and then stored in MongoDB in Student Collections. In further embodiments, a Recruiter working mechanism can include: (1) Recruiter requests a particular student's information using student ID and email ID, which in terms, first contacts the Student Collections to capture the Android token (Instance ID for the phone so it is the unique id generated for the phone); (2) Android token is extracted to generate a push notification to the student; (3) A push notification has been sent to the user phone for accepting or rejecting the challenge of verifying his or her records. Additional embodiments can include student on receiving a push notification has the full authority to accept or reject the challenge request from recruiter. If Student denies the challenge request then the process stops there and Recruiter will not go further to check the student's records. Some embodiments include a Recruiter on receiving the "accepted" notification, which can include: (1) Extracts the transaction hash from Student Collections mapped with email ID; (2) Extracts the transaction hash from Registrar Collections mapped with student ID. Other embodiment include a Validating student records by Recruiter, which can include: (1) Transaction hash obtained from the first step from Recruiter receiving the "accepted" notification is used to get the information from blockchain; (2) Information obtained from blockchain (from above step) is specified as stdinfo stdhx; (3) Transaction hash obtained from Extracts the transaction hash from Registrar Collections mapped with student ID is used to get the information from blockchain; (4) Information obtained from blockchain is specified as stdinfo reghx; (5) Verifies the student's identity by extracting his or her records from the blockchain as per the two hashes (stdinfo_stdhx and stdinfo_reghx) and compares them to see if the records signed by the student and the registrar matches; (6) Verified result has been stored in the recruiter's profile for that student.

In one or more embodiments, attributes of the student records can be preserved as "clear text" (a.k.a. payload) when serialized into the blockchain via blockchain transactions. Each attribute (clear text data) can be serialized as a single blockchain transaction. A unique blockchain transaction hash is the output of this confirmed transaction. The unique block transaction hash can be stored into a MongoDB (or any database) for future reference and dereference with respect to the data creator. Knowing in advance that the MongoDB is a centralized database coordinator for the student profiles and business logic workflows, some embodiments avoided storing actual student record attributes into the MongoDB. Only the unique blockchain transaction hashes and user identifier were stored within MongoDB. The original data itself only resides on the mobile application's phone owned by the student to achieve data privacy. In other embodiments, a user with a blockchain data explorer program can view the blockchain transaction hash and respective payload to see these "clear text" attributes recorded.

In one or more embodiments, attributes of the student records can be anonymized using Cryptographic Hash Function (CHF) SHA-256 against each of the "clear text" attribute. The output of the SHA-256 (of the "clear text") can then be recorded into the respective blockchain transaction. SHA-256 is a one-way cryptographic hash function because given the SHA-256 hash output, one cannot determine the original "clear text" input. The data serialization is identified via the blockchain transaction hash that recorded the SHA-256 hash output of the student record "attributes" instead of the original "clear text" attributes. Additional source code capabilities to handle "CHF hashed payload" can be added into the Android and Node.js Javascript clients to preserve data privacy and workflow end-to-end.

In one or more embodiments, additional randomized string (a.k.a. salt (cryptography)) can be generated and managed in a separate process to pre-append as the prefix to the "clear text" data attribute before that entire string becomes the input to SHA-256 CHF. This provides an additional level of privacy protection because only the original data creator knows the unique seed that generated the salt value. In further embodiments, encryption techniques such as symmetric or asymmetric encryptions schemes can provide additional data privacy protection. These encryption schemes requires encryption key management to manage and operate.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200, 220, 240, 260 and methods 270, 285 presented in FIGS. 1, 2A-2I, and 3. A blockchain server that manages group membership and a records verification system, as described herein, can be a network element within virtualized communication network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
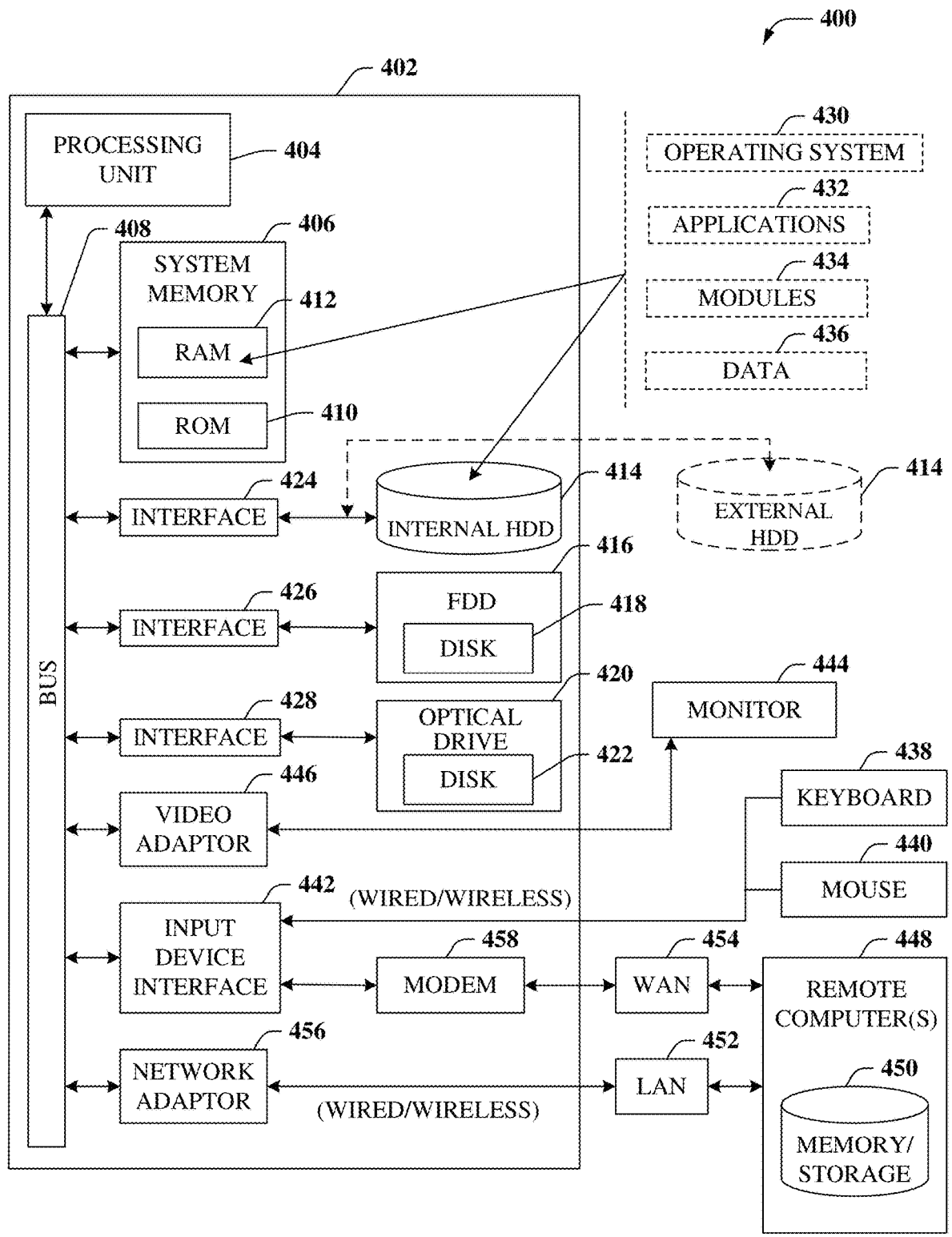
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Further, computing environment 400 can be used for devices 204-213, 244-252, and the devices shown in FIGS. 2G-2I.

Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
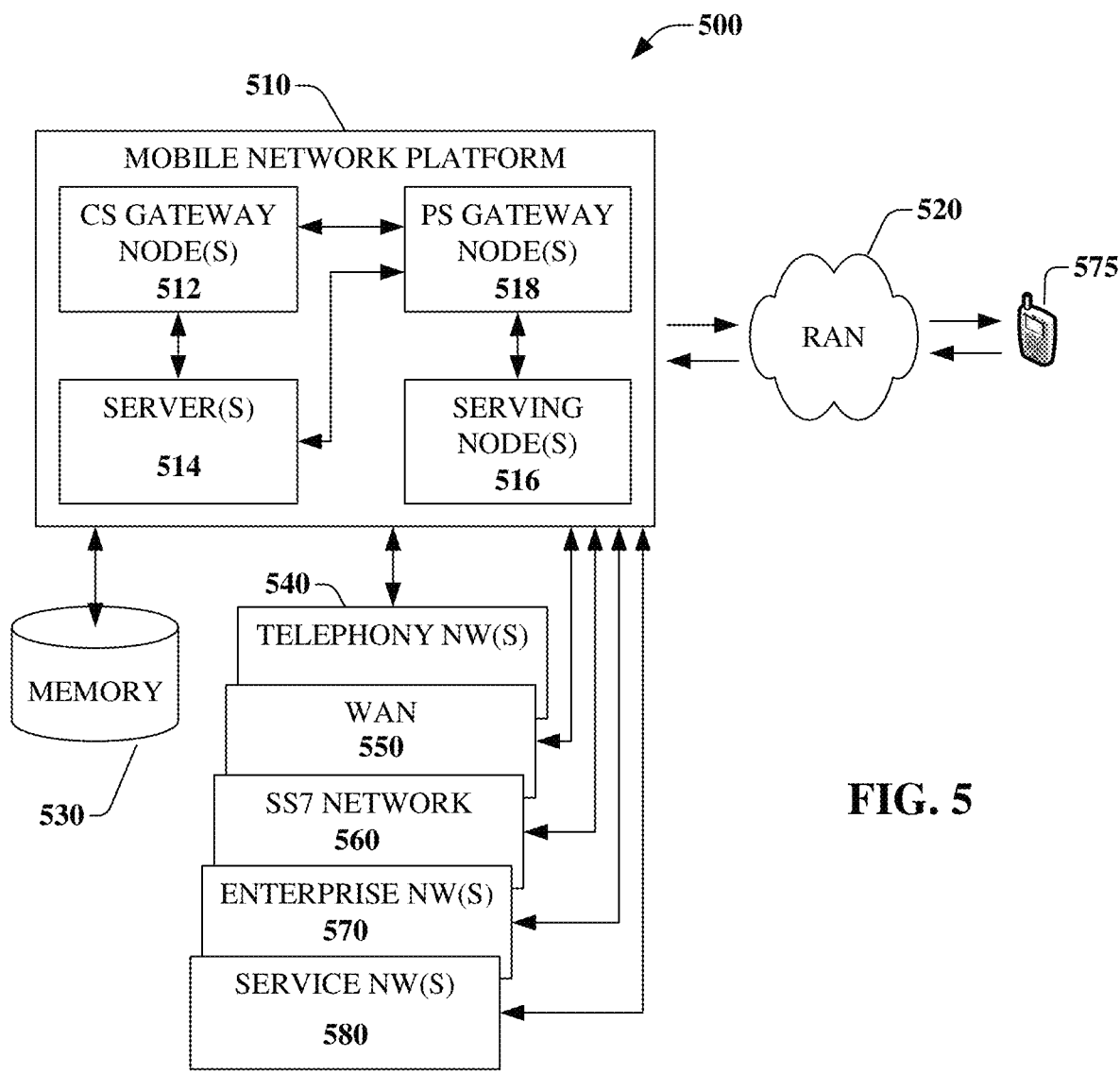
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. A blockchain server that manages group membership and a records verification system, as described herein, can be a network element within mobile network platform 510.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WAN) 550, enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) of radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
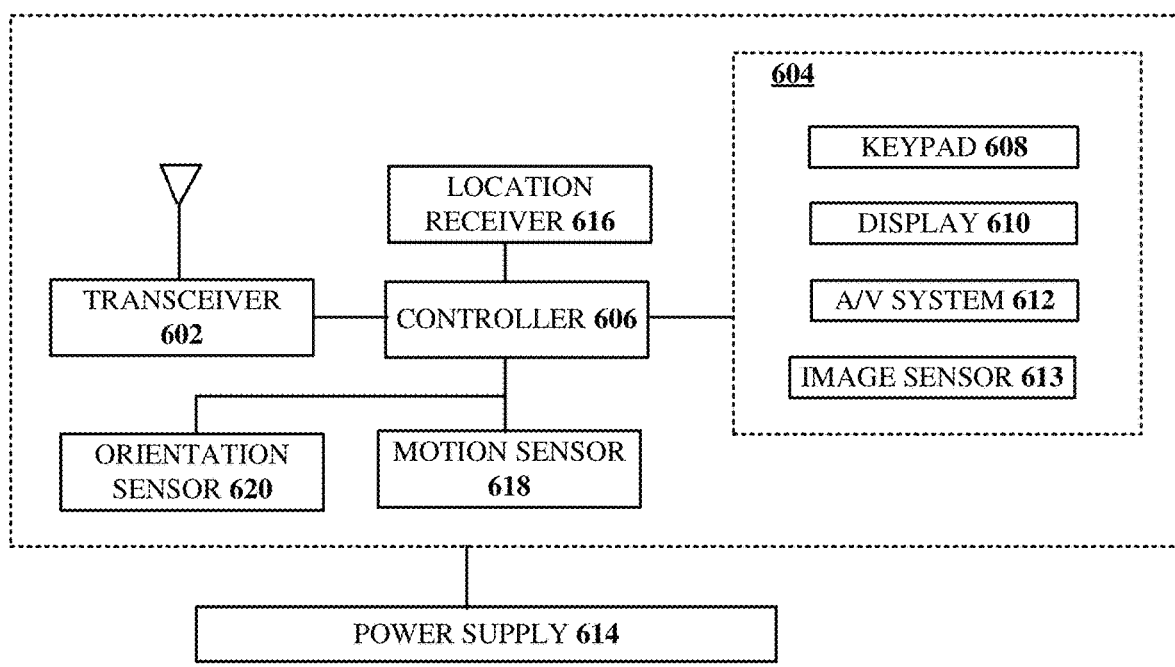
FIG. 6 is a block diagram of an example, non-limiting embodiment of a communication device in accordance with various aspects described herein.

Turning now to FIG. 6, an illustrative embodiment of a communication device 600 is shown. Further, communication device 600 can be used for devices 204-213, 244-252, and the devices shown in FIGS. 2G-2I.

The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   receiving first user-generated input from a recruiter device, wherein the recruiter device is associated with a manager of a group;
   generating a first smart contract between an applicant and the manager according to the first user-generated input, wherein the generating of the first smart contract comprises generating the first smart contract on a blockchain;
   providing the applicant access to the group according to the first smart contract;
   receiving second user-generated input from the recruiter device;
   generating a second smart contract between a record keeper and the manager according to the second user-generated input, wherein the generating of the second smart contract comprises
   generating the second smart contract on the blockchain; and
   providing the record keeper access to the group according to the second smart contract;
   receiving a portion of applicant records from a record keeper device of the record keeper, wherein the portion of applicant records comprises information corresponding to the applicant;
   publishing a portion of the applicant records to the blockchain, wherein the publishing the portion of the applicant records comprises hashing the portion of the applicant records resulting in a hashed portion of the applicant records, wherein the operations comprise storing the hashed portion of the applicant records in a database;
   receiving third user-generated input from an applicant device of the applicant;
   signing the portion of the applicant records on the blockchain according to the third user-generated input;
   receiving fourth user-generated input from the recruiter device, wherein the fourth user-generated input comprises a request for the portion of the applicant records;
   sending a notification to the applicant device, wherein the notification informs the applicant about the request;
   obtaining the portion of the applicant records from the hashed portion of the applicant records from the database in response to receiving a fifth user-generated input from the applicant device, wherein the fifth user-generated input comprises an approval to provide the portion of the applicant records; and
   providing the portion of the applicant records to the recruiter device.

2. The device of claim 1, wherein providing the applicant access to the group comprises performing a first transaction on the blockchain, wherein providing the record keeper access to the group comprises performing a second transaction on the blockchain.

3. The device of claim 1, wherein the publishing of the portion of the applicant records to the blockchain comprises performing a third transaction on the blockchain, wherein the signing of the portion of the applicant records on the blockchain comprises performing a fourth transaction on the blockchain.

4. The device of claim 1, wherein the applicant records comprises attributes, wherein the attributes comprises a full name of the applicant, an applicant identifier, university name, type of degree, department, and graduation year, wherein the portion of the applicant records comprises an attribute.

5. The device of claim 1, wherein hashing the portion of the applicant records comprises encrypting the portion of the applicant records.

6. The device of claim 1, wherein the blockchain is one of a Bitcoin blockchain, a Hyperledger blockchain, or an Ethereum blockchain.

7. The device of claim 1, wherein the receiving a portion of applicant records comprises receiving an image of the applicant.

8. The device of claim 7, wherein the publishing a portion of the applicant records to the blockchain comprises publishing the image of the applicant to the blockchain.

9. The device of claim 1, wherein the sending a notification to the applicant device comprises sending a push notification to the applicant device for accepting the request for the portion of applicant records.

10. A non-transitory machine-readable medium, comprising executable instructions that, when executed by a processing system including a processor, facilitate performance of operations, the operations comprising:

receiving first user-generated input from a recruiter device, wherein the recruiter device is associated with a manager of a group;

generating a first smart contract between an applicant and the manager according to the first user-generated input, wherein the generating of the first smart contract comprises generating the first smart contract on a blockchain;

providing the applicant access to the group according to the first smart contract;

receiving second user-generated input from the recruiter device;

generating a second smart contract between a record keeper and the manager according to the second user-generated input, wherein the generating of the second smart contract comprises generating the second smart contract on the blockchain;

providing the record keeper access to the group according to the second smart contract;

receiving a portion of applicant records from a record keeper device of the record keeper, wherein the applicant records comprise information corresponding to the applicant;

publishing a portion of the applicant records to the blockchain, wherein the publishing the portion of the applicant records comprises hashing the portion of the applicant records resulting in a hashed portion of the applicant records, wherein the operations comprises storing the hashed portion of the applicant records in a database;

receiving third user-generated input from an applicant device of the applicant;

signing the portion of the applicant records on the blockchain according to the third user generated input;

receiving fourth user-generated input from the recruiter device, wherein the fourth user generated input comprises a request for the portion of the applicant records;

sending a notification to the applicant device, wherein the notification informs the applicant about the request;

obtaining the portion of the applicant records from the hashed portion of the applicant records from the database in response to receiving a fifth user-generated input from the applicant device, wherein the fifth user-generated input comprises an approval to provide the portion of the applicant records; and providing the portion of the applicant records to the recruiter device.

11. The non-transitory machine-readable medium of claim 10, wherein providing the applicant access to the group comprises performing a first transaction on the blockchain, wherein providing the record keeper access to the group comprises performing a second transaction on the blockchain.

12. The non-transitory machine-readable medium of claim 10, wherein the publishing of the portion of the applicant records to the blockchain comprises performing a third transaction on the blockchain, wherein the signing of the portion of the applicant records on the blockchain comprises performing a fourth transaction on the blockchain.

13. The non-transitory machine-readable medium of claim 10, wherein the applicant records comprises attributes, wherein the attributes comprises a full name of the applicant, an applicant identifier, university name, type of degree, department, and graduation year, wherein the portion of the applicant records comprises an attribute.

14. The non-transitory machine-readable medium of claim 10, wherein hashing the portion of the applicant records comprises encrypting the portion of the applicant records.

15. The non-transitory machine-readable medium of claim 10, wherein the blockchain is one of a Bitcoin blockchain, a Hyperledger blockchain, or an Ethereum blockchain.

16. The non-transitory machine-readable medium of claim 10, wherein the receiving a portion of applicant records comprises receiving an image of the applicant.

17. The non-transitory machine readable medium of claim 16, wherein the operations further comprise comparing the image to an image encrypted and stored in the database.

18. A method, comprising:

receiving, by a processing system including a processor, first user-generated input from a recruiter device, wherein the recruiter device is associated with a manager of a group;

generating, by the processing system, a first smart contract between an applicant and the manager according to the first user-generated input, wherein the generating of the first smart contract comprises generating, by the processing system, the first smart contract on a blockchain;

providing, by the processing system, the applicant access to the group according to the first smart contract;

receiving, by the processing system, second user-generated input from the recruiter device;

generating, by the processing system, a second smart contract between a record keeper and the manager according to the second user-generated input, wherein the generating of the second smart contract comprises generating, by the processing system, the second smart contract on the blockchain;

providing, by the processing system, the record keeper access to the group according to the second smart contract;

receiving, by the processing system, a portion of applicant records from a record keeper device of the record keeper, wherein the applicant records comprise information corresponding to the applicant;

publishing, by the processing system, a portion of the applicant records to the blockchain wherein the publishing the portion of the applicant records comprises hashing, by the processing system, the portion of the applicant records resulting in a hashed portion of the applicant records;

receiving, by the processing system, third user-generated input from an applicant device of the applicant; and signing, by the processing system, the portion of the applicant records on the blockchain according to the third user-generated input;

receiving, by the processing system, fourth user-generated input from the recruiter device, wherein the fourth user-generated input comprises a request for the portion of the applicant records;

sending, by the processing system, a notification to the applicant device, wherein the notification informs the applicant of the request;

obtaining, by the processing system, the portion of the applicant records from the hashed portion of the applicant records from a database in response to receiving, by the processing system, a fifth user-generated input from the applicant device, wherein the fifth user-generated input comprises an approval to provide the portion of the applicant records; and providing, by the processing system, the portion of the applicant records to the recruiter device.

19. The method of claim 18, wherein hashing the portion of the applicant records comprises encrypting, by the processing system, the portion of the applicant records.

20. The method of claim 18, wherein hashing the portion of the applicant records comprises hashing the portion of the applicant records using a cryptographic hash function SHA-256, wherein the hashed portion of the applicant records are anonymized by using the cryptographic hash function SHA-256.

* * * * *